United States Patent [19]

Taviere et al.

[11] 3,845,924
[45] Nov. 5, 1974

[54] CUSHIONING AND VIBRATION DAMPING SUPPORTS

[75] Inventors: Jean Andre Taviere; Pascal Xavier Taviere, both of Paris, France

[73] Assignee: Caoutchouc Industriel De Rochassieux S.A., La Bridoire, France

[22] Filed: Nov. 27, 1972

[21] Appl. No.: 309,682

[30] Foreign Application Priority Data
Nov. 30, 1971 France .............................. 71.42963

[52] U.S. Cl. ................ 248/22, 248/358 R, 267/153
[51] Int. Cl. ........ B60g 11/18, F04h 9/02, F16f 3/00
[58] Field of Search ............... 248/22, 20, 21, 24, 9, 248/10, 358 R; 267/153, 152

[56] References Cited
UNITED STATES PATENTS

| | | | |
|---|---|---|---|
| 2,069,270 | 2/1937 | Piron | 248/10 X |
| 2,117,264 | 5/1938 | Workman | 248/358 R |
| 2,245,295 | 6/1941 | Piron | 248/358 R X |
| 2,322,193 | 6/1943 | Kaemmerling | 248/358 R |
| 2,783,959 | 3/1957 | Boschi et al. | 248/22 |
| 3,231,256 | 1/1966 | Olson | 248/358 R X |
| 3,460,786 | 8/1969 | Rivin | 267/153 X |

*Primary Examiner*—J. Franklin Foss
*Attorney, Agent, or Firm*—Robert E. Burns; Emmanuel J. Lobato; Bruce L. Adams

[57] ABSTRACT

A cushioning and vibration damping support includes a plurality of independent spaced apart coaxial annular absorbing elements of an elastic material disposed with a plane perpendicular to the central axis passing through each element. Load-supporting surfaces of said elements are defined by a paraboloid coaxial with said central axis, the distance of said load supporting surfaces from said plane decreasing as the radial distance from said central axis increases. A rigid load-carrying bearing part has a concave surface of lesser curvature than said paraboloid, which bears on the load-supporting surfaces of successive elements as the load increases.

16 Claims, 3 Drawing Figures

CUSHIONING AND VIBRATION DAMPING SUPPORTS

The invention relates to cushioning and vibration damping supports, i.e., vibration absorbers, for machines and apparatus.

There are two main categories of vibration damping supports: those whose rigidity is constant, i.e., for which a linear part of the force/deformation curve is used; and those whose rigidity is not constant, i.e., in which a non-linear part of the force/deformation curve is employed. Non-linearity may be the result either of a high compression ratio of the elastic material, or of a special design.

Amongst absorbers in this second category are types, such as those described in French Pat. Nos. 1,291,308 and 1,517,606, which include a plurality of absorbing elements of varying height, in a manner to increase on the one hand the efficiency of the absorber (damping factor) and on the other hand its load capacity. However, even these absorbers have a variation in their natural frequency as a function of the load.

This is a serious fault since the load is practically never uniformly distributed over the various points of suspension of a machine; moreover, for many machines, the load varies during operation. Consequently, with these known absorbers it is difficult to ensure avoidance of any resonance phenomena at one or more points of support of a machine. The detrimental consequences of resonance phenomena are known: for example wear to the machine, and a decrease in the precision and working rate.

An alternative proposal was to provide elastic cushioning and damping supports in steel, the fundamental progressive absorbing properties of which material enable the provision of a constant natural frequency for a relatively wide range of loads. However, such supports are necessarily of a very elaborate and costly structure and one does not obtain properties of vibration damping as favourable as can be obtained with other elastic materials, such as elastomers, notably due to the inherent internal viscous friction, significant loss angle, and low speed of transmission of sound of such materials.

According to the invention, there is provided a cushioning and vibration damping support including a plurality of independent elements of an elastic material, said elements being disposed about a common central axis with a plane perpendicular to said central axis passing through each element, said elements each having a load-supporting surface, the load-supporting surfaces of said elements being defined at least approximately by a paraboloid coaxial with said central axis, the distance of said load supporting surfaces from said plane decreasing as the radial distance from said central axis increases.

Said elements are preferably disposed at least approximately in the configuration of a plurality of coaxial annuli, each annulus including at least one element defining at least a part of an inner edge of the annulus and at least a part of an outer edge of the annulus, said inner edge of each annulus being spaced radially apart from said outer edge of an adjacent annulus.

The support advantageously comprises a rigid load-carrying bearing piece cooperating with said elements, said bearing piece having a concave surface defined at least approximately by a paraboloid of lesser curvature than the paraboloid of said load-supporting surfaces, said concave surface of the bearing piece being placed coaxial with said central axis and against and facing said load-supporting surfaces, said concave surface resting in the absence of load only on the load-supporting surface of a central element. Said bearing piece may have a planar face on which a machine rests and a concave face which progressively contacts the load-bearing surfaces of the elements as a function of the increasing load.

Because of the particular shape defining the load supporting surfaces of the elastic elements, a support or absorber according to the invention may be made with a stable frequency for loads varying by a factor of from 1 to 15. Consequently it is possible with only a few different types of support to cover a wide field of applications from very light machines to very heavy machines. Also, the said particular shape gives the absorber a high efficiency for the attenuation of transmissibility of vibrations and for limitation of the amplitude of oscillation, even at resonance.

The invention is based on the observation that a constant value of the natural resonant pulsation, and consequently the natural frequency, could be obtained by the addition of a certain number of elements of increasing stiffness disposed about a common central axis and with their load supporting surfaces disposed as defined above.

Excellent results are notably obtained when the mean height of the load-supporting surfaces of the elements decreases in such a manner that the stiffness of the assembly itself increases according to a geometrical progression by a factor 2. The parameter of factor 2 is no imperative since it is possible to adopt factor of lower value, which enables the resonant pulsation to be fixed with as great a precision as desired. Thus, when the elements are disposed in the configuration of coaxial annuli, a load applied progressively acts on successive annuli from the centre outwards, and the stiffness of the absorber increases in a geometric progression by a factor of at most 2 from one annulus to the next.

To obtain good results a relatively large number of annular elements may be employed. In practice, a geometrical progression by factor 2 and the use of five concentric annular elements enables excellent results to be obtained, the variation of the resonant pulsation being confined to ± 5 percent.

Two embodiments of the invention will now be described, by way of example, with reference to the accompanying drawings, in which.

Figure 1:
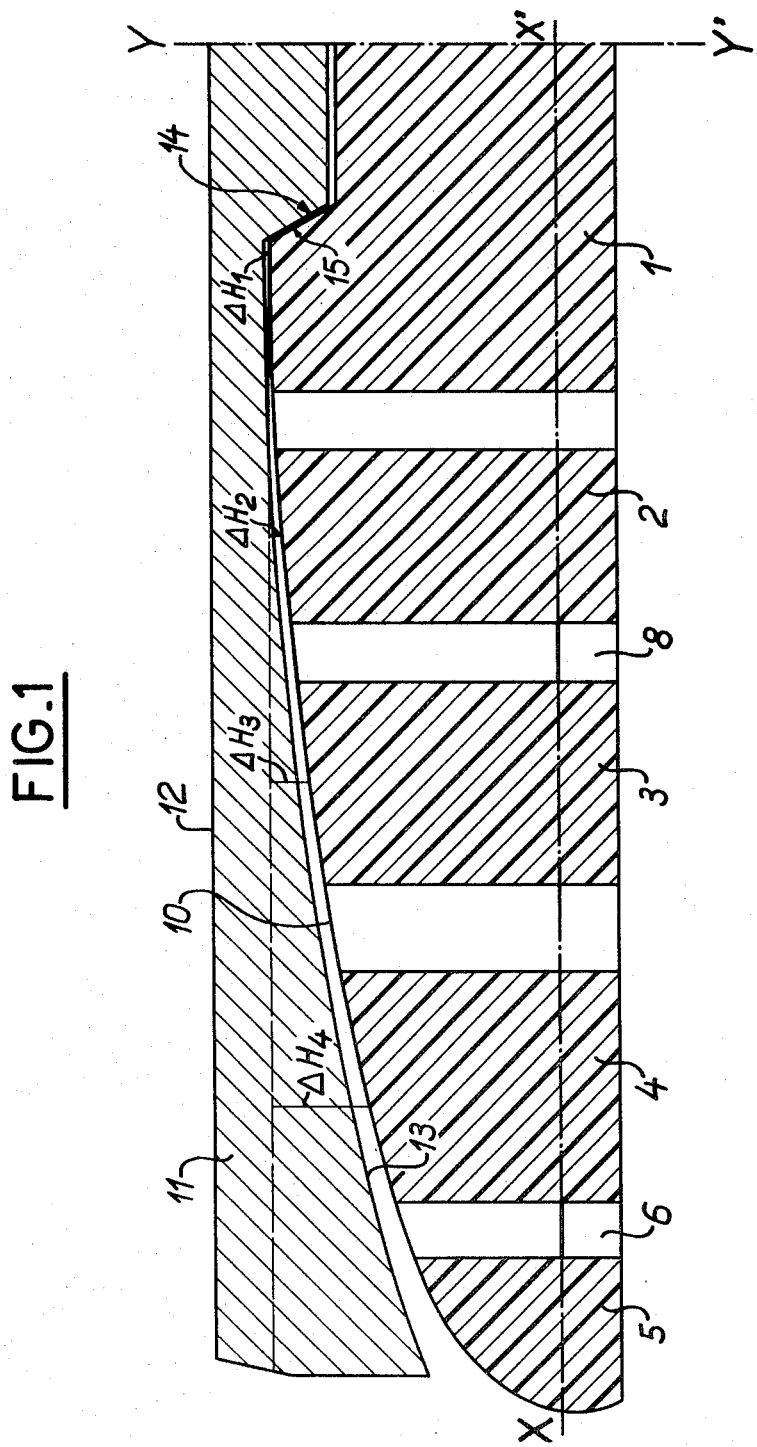
FIG. 1 is a cross-section taken along line I—I of FIG. 2, showing half of a first embodiment of support.
Figure 2:
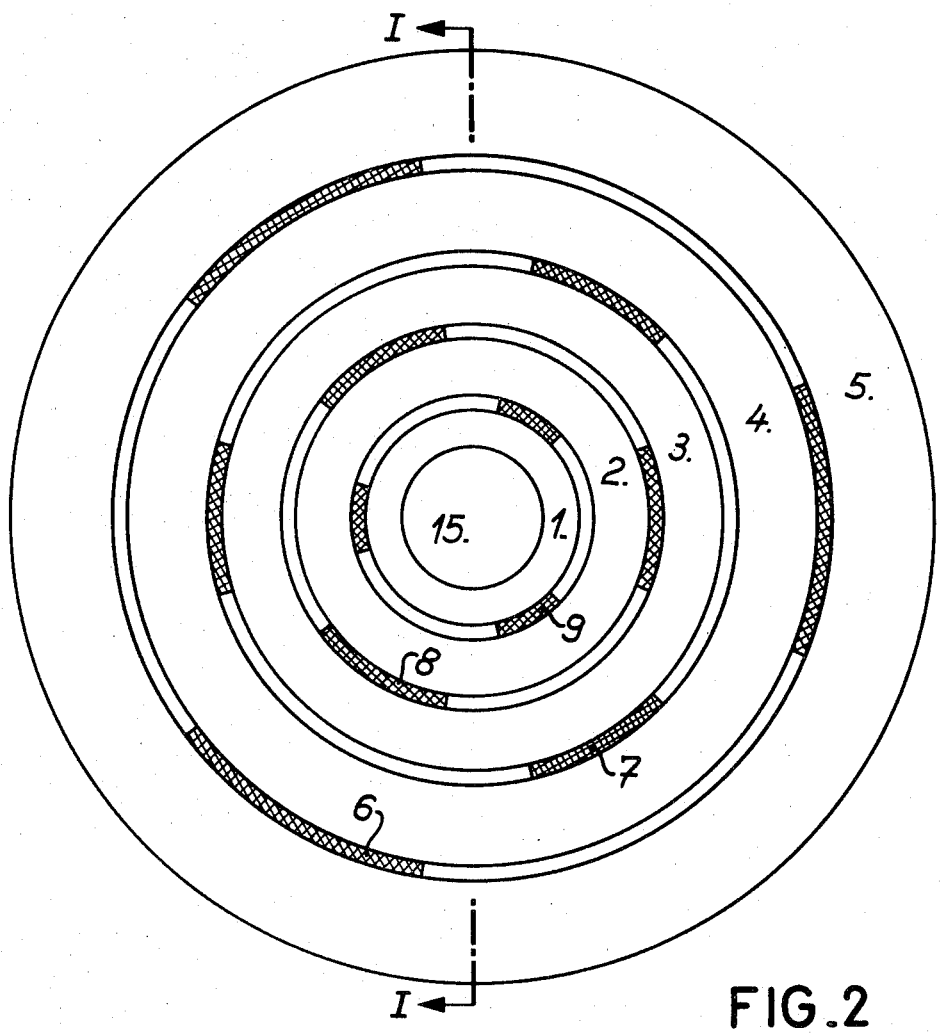
FIG. 2 is a plan view of this support.

FIG. 1 shows half of a cushioning and vibration damping support, the other half being symmetrical in relation to the axis Y-Y'. Elastic support means includes five absorbing elements 1, 2, 3, 4 and 5 made in one piece and interconnected by symmetrically disposed sectors 6, 7, 8 and 9 of small width, which serve to hold the absorbing elements concentric about the axis Y-Y' but allow the elements to remain independent of one another from the point of view of absorption of vibrations during operation. The absorbing elements are of an elastic material namely an elastomer such as neoprene, or a butyl or nitrile synthetic rubber.

The central element 1 is substantially cylindrical, and the other elements are annular. The height of the upper load-supporting surfaces of elements 1 to 4, in relation to a plane perpendicular to axis Y—Y and passing through all of the elements, for example along line X–X' as shown in FIG. 1, progressively decreases with the distance from axis Y–Y'. These load-supporting surfaces are defined by an enveloping curve which is approximately a paraboloid 10 whose axis is Y–Y'. The outer surface of the peripheral element 5 is defined by a sector of a parabola $y^2 = 2\,px$, whose axis is X–X'. By way of example, for an absorber used for loads from 100 to 1,500 kg and of diameter 122 mm, $p = 3.80$ mm and $x = 11.60$ mm, and the height of the load-bearing surface of elements 1 to 4 decreases as a function of the distance from the axis Y–Y' according to the curve shown in FIG. 1. Approximately, the means reduction of height $\Delta H_1$, $\Delta H_2$, $\Delta H_3$, $\Delta H_4$, as indicated on FIG. 1, varies according to a geometrical progression by a factor 2.

The elastic elements have placed thereon a metallic bearing piece or capstan 11 of discoidal shape having a planar upper face 12 on which a machine-tool is supported and a lower face 13 having a concavity the curvature of which is slightly less than that of paraboloid 10, so that the surface 13 of the capstan comes progressively into contact with the elements, from the centre towards the exterior, as the load on capstan 11 increases. At its centre, face 13 has a trunco-conical protuberance 14 cooperating with a dish-shaped recess 15 of the central element 1 so as to centre capstan 11.

Figure 3:
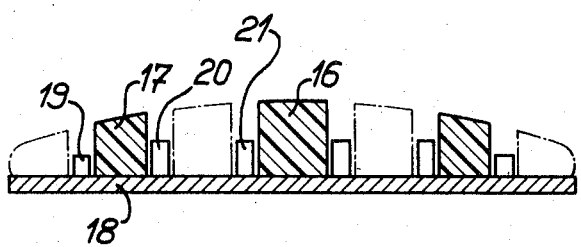
FIG. 3 is a schematic cross-section through a second embodiment of support.

In the varied embodiment shown in FIG. 3, a plurality of concentric elastic elements such as 16 and 17 are simply posed on a support plate 18 which has means for holding said elements spaced apart from said central axis at defined radial distances, in the form of sector-shaped projections 19, 20 and 21 on plate 18, three of each of these projections being disposed at 120° in circular configuration to maintain the elastic elements concentric. This embodiment offers great flexibility in use of the support according to the invention, by enabling different elastic elements to be combined at will.

Of course, the invention is not limited to the use of concentric annular elements, but it is possible to use elements of various shapes arranged about a central axis. One variation is for the elements to be arranged in the configuration of a plurality of coaxial spaced-apart annuli, each annulus including a plurality of spaced-apart sector shaped elements.

What is claimed is:

1. A cushioning and vibration damping support, including a plurality of independent elements comprising an elastic material, said elements being disposed about a common central axis and each having a planar base portion defining a common base plane perpendicular to said central axis and a load-supporting surface, the load-supporting surfaces of said elements approximately defining a paraboloid coaxial with said central axis wherein the distance of said load supporting surfaces from said common base plane decreases as the radial distance from said central axis increases.

2. A support as claimed in claim 1, in which said elements are disposed in the configuration of a plurality of coaxial annuli, each annulus including at least one element defining at least a part of an inner edge of the annulus and at least a part of an outer edge of the annulus, said inner edge of each annulus being spaced radially apart from said outer edge of an adjacent annulus.

3. A support as claimed in claim 2, comprising a plurality of annular elements disposed coaxially about a central cylindrical element.

4. A support as claimed in claim 3, in which the outer surface of the outer of said annular elements, seen in a crosssection taken through a plane perpendicular to said common base plane, is defined at least approximately by a parabola the axis of which is orthogonal to said central axis.

5. A support as claimed in claim 1, comprising a rigid load-carrying bearing piece cooperating with said elements, said bearing piece having a concave surface defined at least approximately by a paraboloid of lesser curvature than the paraboloid of said load-supporting surfaces, said concave surface of the bearing piece being placed coaxial with said central axis and against and facing said load-supporting surfaces, said concave surface resting in the absence of load only on the load-supporting surface of a central element.

6. A support as claimed in claim 2, in which said elements are removably placed on a rigid base plate, said base plate including means for holding said elements spaced apart from said central axis at defined radial distances.

7. A support as claimed in claim 2, in which when a load applied acts on successive annuli of elements from the centre outwards the stiffness of the support increases in a geometric progression by a factor of at most 2 from one annulus to the next.

8. A vibration-proof support comprising: elastic support means comprising means defining a planar base portion having a central axis perpendicular thereto and means defining a load bearing surface having a parabolic cross-section symmetrical about said central axis wherein the height of the load bearing surface from the planar base decreases as the distance from said central axis increases.

9. A support according to claim 8, wherein said elastic support means comprises a plurality of independent elastic members each disposed about said central axis and wherein said means defining said planar base portion comprises one end of each elastic member having a planar surface and wherein said means defining said load bearing surface comprises each of said elastic members having a predetermined height and the other end portion thereof having an arcuate configuration corresponding to a section of the parabolic cross-section.

10. A support according to claim 9, wherein the plurality of elastic members comprise a plurality of annular shaped members disposed coaxially about a central cylindrical member and radially spaced from each other.

11. A support according to claim 8, further comprising a rigid load carrying member having one concave surface contacting said load bearing surface and another surface receptive of a load therein.

12. A support according to claim 11, wherein said one surface of said rigid member has a parabolic cross section symmetrical about a center and point coincident with said central axis having less curvature than said parabolic cross-section of said working surface whereby said one surface of said rigid member only contacts the portion of said load bearing surface closest to said central axis in the absence of a load on said another surface of said rigid member.

13. A supporting according to claim 11, further comprising means for centering said one concrete surface about said central axis and for holding same in the centered position.

14. A support according to claim 8, further comprising a planar base plate on which the planar base of said elastic support means is mounted.

15. A support according to claim 9, further comprising a planar base plate on which the planar surface of each member is mounted and means spacing the members apart in a vibrationally isolated condition.

16. A support according to claim 9, wherein the stiffness of each of said plurality of members is twice as great as the stiffness of the adjacent member closer to said central axis.

* * * * *